US006390224B1

(12) United States Patent
Yoshida

(10) Patent No.: US 6,390,224 B1
(45) Date of Patent: May 21, 2002

(54) FRONT SUB-FRAME STRUCTURE

(75) Inventor: Hiroyuki Yoshida, Saitama (JP)

(73) Assignee: Honda Giken Kogyo Kabushiki Kaisha, Tokyo (JP)

(*) Notice: Subject to any disclaimer, the term of this patent is extended or adjusted under 35 U.S.C. 154(b) by 0 days.

(21) Appl. No.: 09/505,183

(22) Filed: Feb. 16, 2000

(30) Foreign Application Priority Data

Feb. 19, 1999 (JP) .......................................... 11-042159

(51) Int. Cl.[7] ................................................ B62D 21/00

(52) U.S. Cl. ....................... 180/312; 180/311; 180/902; 280/781; 280/784

(58) Field of Search ................................ 180/312, 311, 180/902; 280/781, 784, 788, 299, 291

(56) References Cited

U.S. PATENT DOCUMENTS

| | | | | |
|---|---|---|---|---|
| 1,565,624 A | * 12/1925 | Chilton | ...................... | 180/312 |
| 4,263,980 A | * 4/1981 | Harlow, Jr. et al. | ......... | 180/292 |
| 4,453,740 A | * 6/1984 | Ohe et al. | .................. | 280/781 |
| 4,753,315 A | * 6/1988 | Fujisaki et al. | ............ | 180/299 |
| 4,817,986 A | * 4/1989 | Kanazawa et al. | .......... | 280/781 |
| 5,074,374 A | * 12/1991 | Ohtake et al. | ............. | 180/312 |
| 5,178,230 A | * 1/1993 | Goor | ......................... | 180/232 |
| 5,685,599 A | * 11/1997 | Kitagawa | .................... | 296/204 |
| 5,862,877 A | * 1/1999 | Horton et al. | ............. | 180/312 |
| 5,884,722 A | * 3/1999 | Durand et al. | ............. | 180/312 |
| 5,899,498 A | * 5/1999 | Horton | ....................... | 280/781 |
| 5,997,038 A | * 12/1999 | Dostert et al. | ............. | 280/781 |
| 6,076,625 A | * 6/2000 | Matt et al. | .................. | 180/312 |
| 6,120,059 A | * 9/2000 | Beckman | .................... | 280/785 |

FOREIGN PATENT DOCUMENTS

| | | |
|---|---|---|
| JP | 59-47519 | 3/1984 |
| JP | 8 164752 | 6/1996 |

* cited by examiner

*Primary Examiner*—Brian L. Johnson
*Assistant Examiner*—Deanna Draper
(74) *Attorney, Agent, or Firm*—Sughrue Mion, PLLC

(57) ABSTRACT

A front sub-frame 1 structure that supports an engine E and to which suspensions are attached includes a front sub-frame main body 1*a* having a U-shaped configuration, when viewed from top, which has an opening directed rearward. Engine mounts 2, 2 are attached to rear portions of side parts of the front sub-frame main body 1*a* for supporting the engine E. A cross member 1*b* for connecting the side parts of the front sub-frame main body 1*a* at rear portions thereof is removably attached thereto from below the front sub-frame main body 1*a*.

7 Claims, 6 Drawing Sheets

M
11
12
R
TM
E
1b
2
2
1
SP
SP
SF
SF
3
1a 1
1m
1c
1a
4
1f
2a
2
5
2b
CB
1b
1d
E
OP

FRONT SUB-FRAME STRUCTURE

BACKGROUND OF THE INVENTION

1. Field of the Invention

The present invention relates to a front sub-frame structure that supports and engine and to which suspensions are attached, and more particularly to a front sub-frame structure which can improve the workability in servicing an oil pan.

2. Description of the Related Art

A front sub-frame of a vehicle is disposed at a lower portion of an engine compartment and is attached to a pair of left and right side frames. The front sub-frame so attached supports a power unit such as an engine and a transmission, and suspensions are also attached thereto.

FIG. 6A is a schematic plan view of a conventional front sub-frame and FIG. 6B is a schematic side view thereof. The front sub-frame 51 has an I-shaped configuration and is secured to a pair of side frames SF, SF with bolts 53, 53, 53, 53. In addition, engine mounts 52, 52 are attached to an upper side of the front sub-frame 51 toward end portions thereof. The engine mounts 52, 52 each comprise rubber members 52*a*, 52*a*, which are adapted to absorb vibrations of an engine E, metallic fixtures 52*b*, 52*b* disposed at top and bottom ends of the rubber members 52*a*, 52*a*, respectively and a bracket 52*c* for securing the cylinder block CB. The engine E is disposed on the upper side of the front sub-frame 51 via the engine mounts 52, 52. Suspensions (not shown) are also attached to the front sub-frame 51. Reference character TM denotes a transmission.

In servicing an oil pan OP disposed at a lower portion of an engine E, the front sub-frame 51 has to be removed from side frames SF, SF. Then, after the oil pan OP has been serviced, the front sub-frame 51 has to re-attached to the side frames SF, SF. Since suspensions are attached to the front sub-frame 51, the alignment of the suspensions has to be re-adjusted after the front sub-frame 51 has been re-attached to the side frames SF, SF. Thus, servicing the oil pan OP requires a great number of man-hours and involves complicated work in respective steps of the service.

SUMMARY OF THE INVENTION

To solve the above drawbacks, an object of the present invention is to provide a front sub-frame structure that can improve the workability in servicing the oil pan.

With a view to attaining the aforesaid object, the present invention provides a front sub-frame structure that supports an engine and to which suspensions are attached, wherein a front sub-frame main body has a U-shaped configuration, when viewed from top, which has an opening directed rearward, wherein engine mounts are attached to rear portions of side parts of said front sub-frame main body for supporting the engine, and wherein a cross member for connecting the side parts of the front sub-frame main body at rear portions thereof is removably attached thereto from below the font sub-frame main body.

According to this front sub-frame structure, in servicing an oil pan, the front sub-frame main body does not have to be removed but the cross member only has to be removed. This obviates the necessity of re-adjustment of the suspensions.

DETAILED DESCRIPTION OF THE PREFERRED EMBODIMENTS

Figure 1:
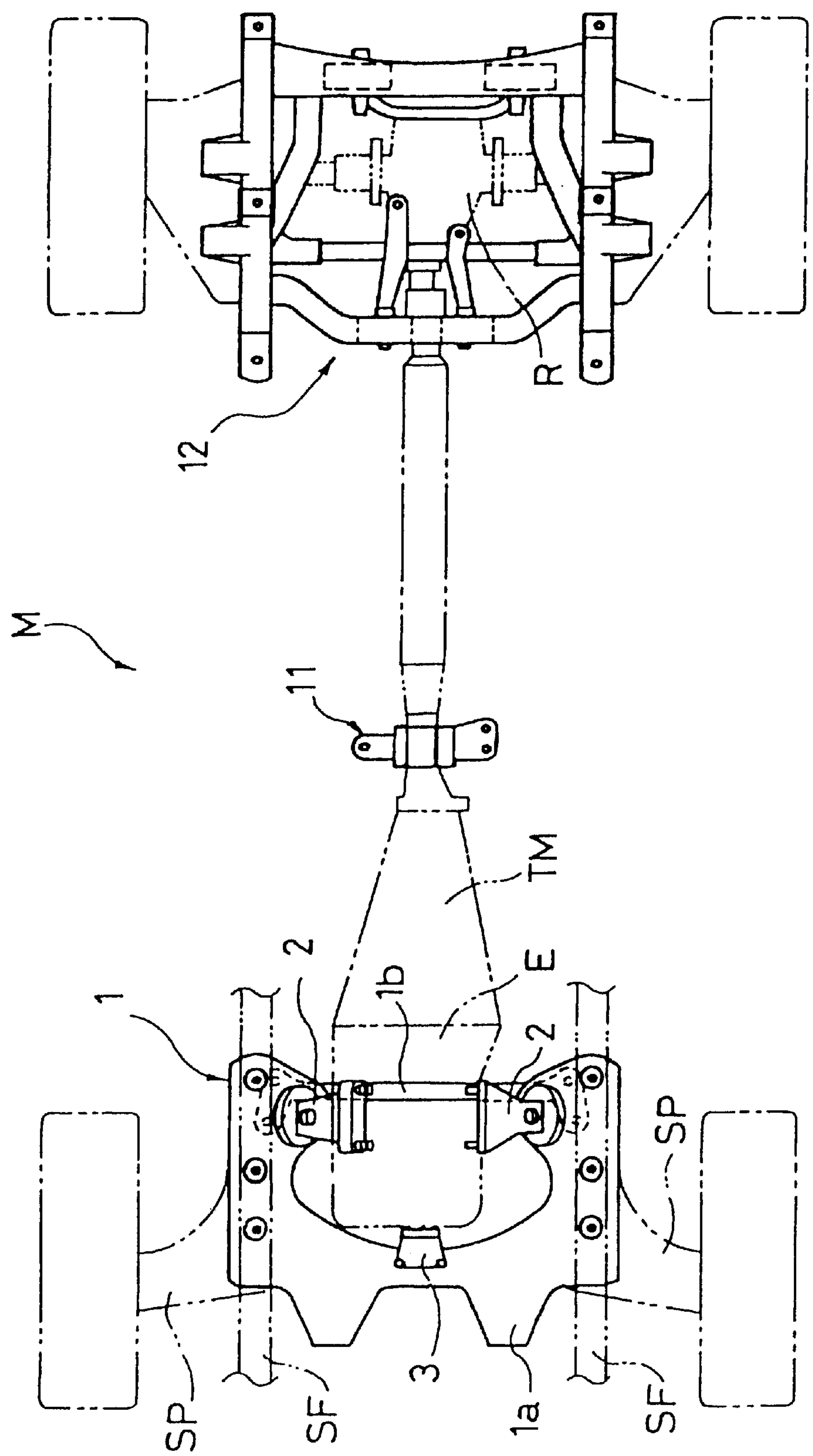
FIG. 1 is a schematic plan view showing an internal construction of a vehicle provided with a front sub-frame structure according to the present invention.

Referring to the accompanying drawings, a front sub-frame structure according to the present invention will be described below. In this embodiment, "front" denotes a front side of a vehicle M, "rear" a rear side of the vehicle M, "upper" a vertically upper side, "lower" a vertically lower side, "outer" a side transversely outwardly of the vehicle M, and "inner" a side transversely inwardly of the vehicle M.

First, referring to FIG. 1, the overall construction of an internal structure of a vehicle M provided with a front sub-frame 1 will be described below.

The vehicle M comprises the front sub-frame 1, a transmission mount 11 and a rear sub-frame 12 which are provided, respectively, at a front, center and rear portion of the vehicle M. An engine E, a transmission TM, a suspension SP and the like are supported on the front sub-frame 1, and a rear end portion of the transmission TM is mounted on the transmission mount 11. Furthermore, a rear differential gear R is mounted on the rear sub-frame 12.

The front sub-frame 1 is secured to a pair of side frames SF, SF. The front sub-frame 1 is mainly constituted by a front sub-frame main body (hereinafter, referred to as main body) 1*a* and a cross member 1*b*. The cross member 1*b* is attached to a rear end portion of the main body 1*a* from therebelow. In addition, engine mounts 2, 2 are attached to an upper rear end portion of the main body 1*a* for supporting the engine E thereon. Furthermore, a stopper 3 is attached to a front portion of the main body 1*a* at a transversely central position thereof for preventing the engine E from being damaged at the time of minor collision.

Next, referring to FIGS. 2 to 4, the front sub-frame 1 will be described in detail.

As described above, the front sub-frame 1 comprises the main body 1*a* and the cross member 1*b*. The main body 1*a* supports thereon the engine E which is made integral with the transmission TM, and suspensions SP (refer to FIG. 1) and a steering gear box are also attached thereto. The cross member 1*b* functions to improve the rigidity of the engine mount portions of the front sub-frame 1, as well as the rigidity of the sub-frame 1 against transverse inputs from the suspensions SP.

The main body 1*a* will be described in detail below.

The main body 1*a* has a U-shaped configuration, when viewed from top, which has an opening directed rearward and is fabricated by pressing. The main body 1*a* comprises a pair of parallel side parts 1*c*, 1*c* and a cross part Id connecting front end portions of the side parts 1*c*, 1*c*, and therefore it is made open rearward. The side parts 1*c*, 1*c* extend along the pair of side frames SF, SF, and those side parts 1*c*, 1*c* are secured to the side frames SF, SF (See FIG. 2). When the front sub-frame 1 supports the engine E, the main body 1*a* is given a shape in which a lower front portion of the engine E (that is, a front portion of an oil pan) and side portions of the engine E are surrounded, respectively, by the cross part id and the side parts 1*c*, 1*c*.

In this embodiment, the configuration of the main body 1*a* is such that the pair of side parts 1*c*, 1*c* are in parallel with each other, but the configuration may be such that the pair of side parts 1*c*, 1*c* become slightly wider or narrower as they extend rearward. In addition, the cross part 1*d* does not always have to connect the side parts 1*c*, 1*c* at the front end portions hereof, 1*c*, but it may connect the side parts 1*c*, 1*c* at portions slightly rearward of the front end portion of the side parts 1*c*, 1*c*, and the main body 1*a* may have an H-shaped configuration when viewed from the top thereof.

As has been described above, the main body 1*a* supports the engine E which is made integral with the transmission TM, and the transmission and steering gear box, both of which are not shown, are attached to the main body 1*a*. Due to this, the main body 1*a* is provided with mounting portions such as engine mounts 2, 2.

Figure 2:
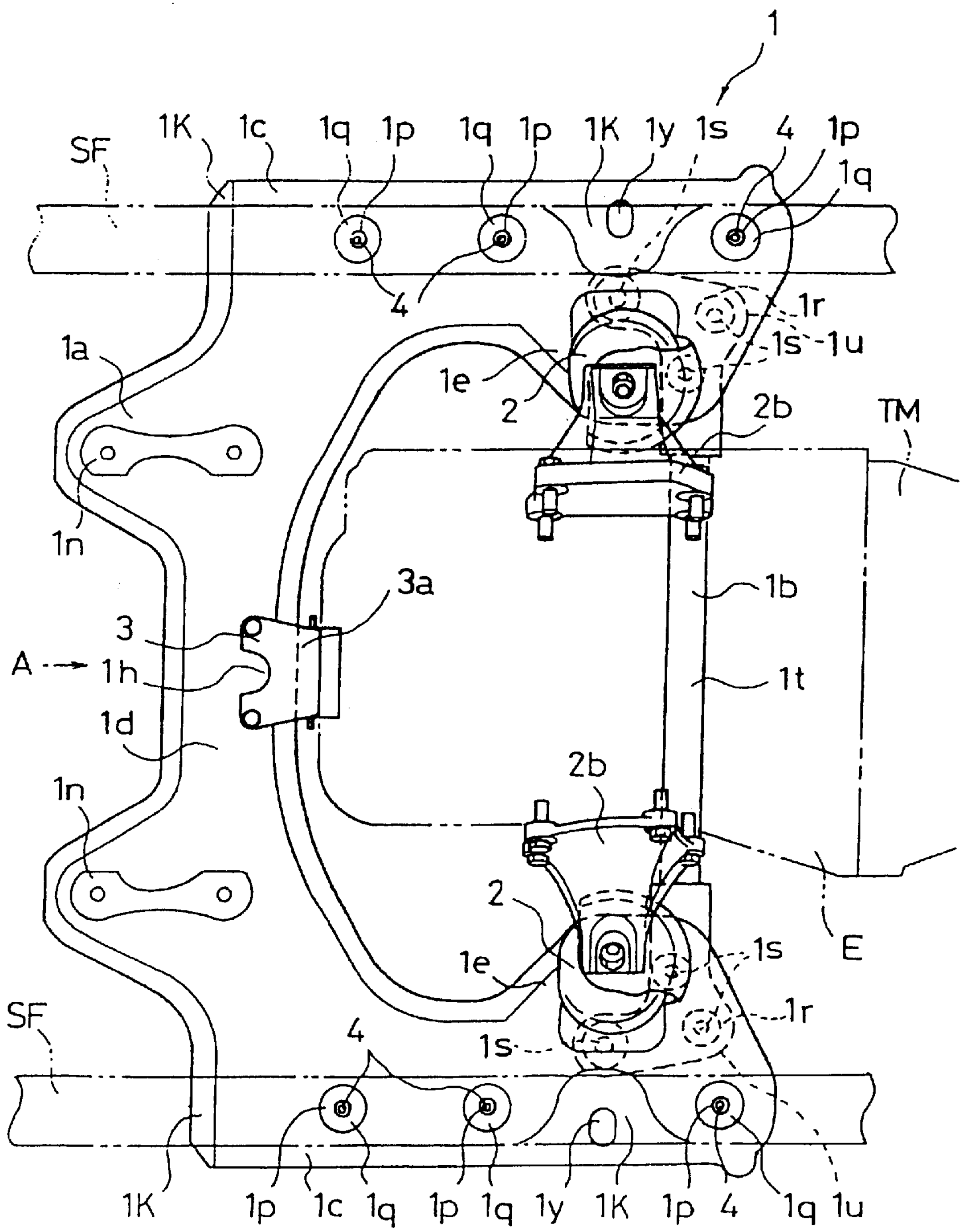
FIG. 2 is a plan view of the front sub-frame according to the present invention.
Figure 3:
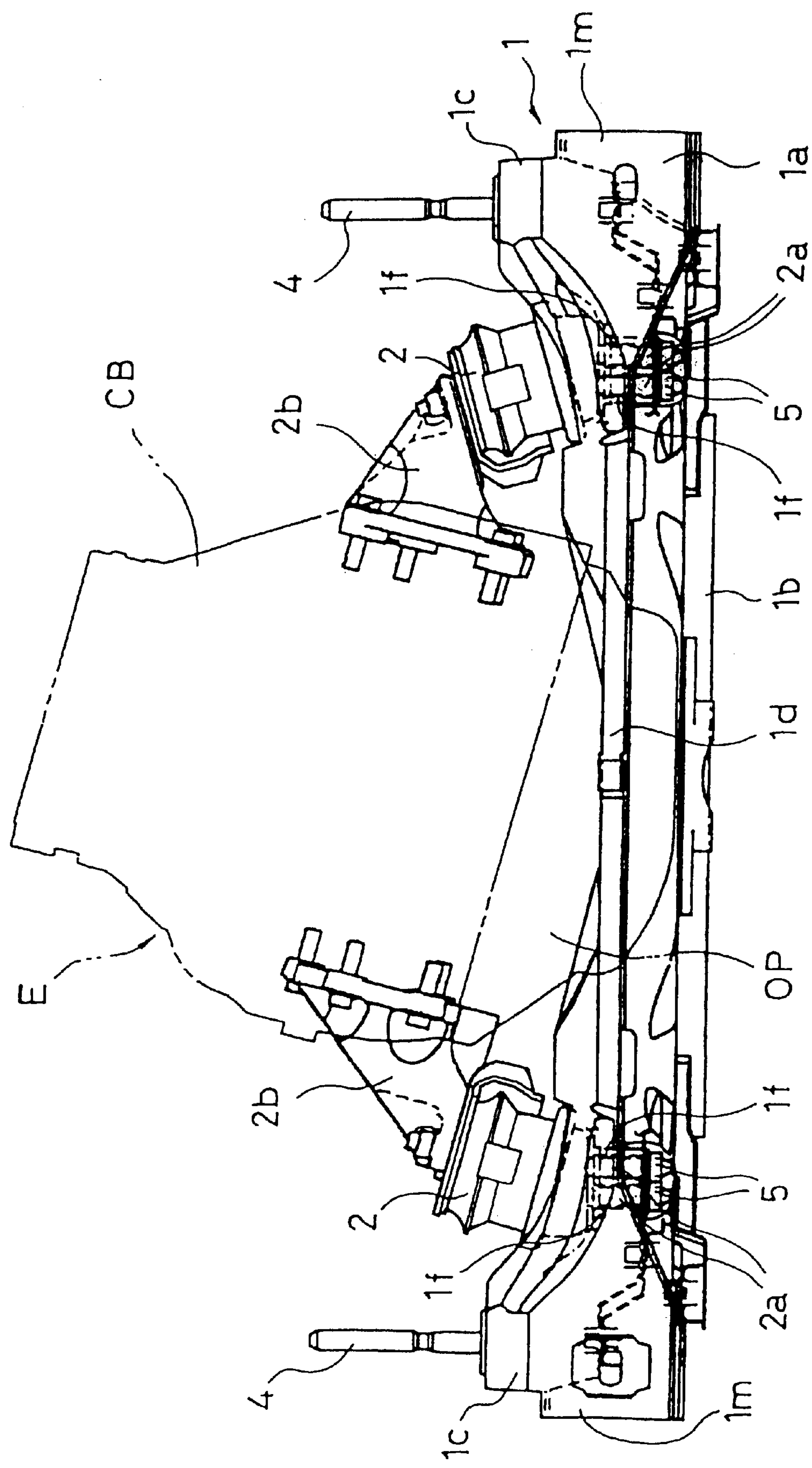
FIG. 3 is a view as shown from a direction indicated by an arrow A in FIG. 2.
Figure 4:
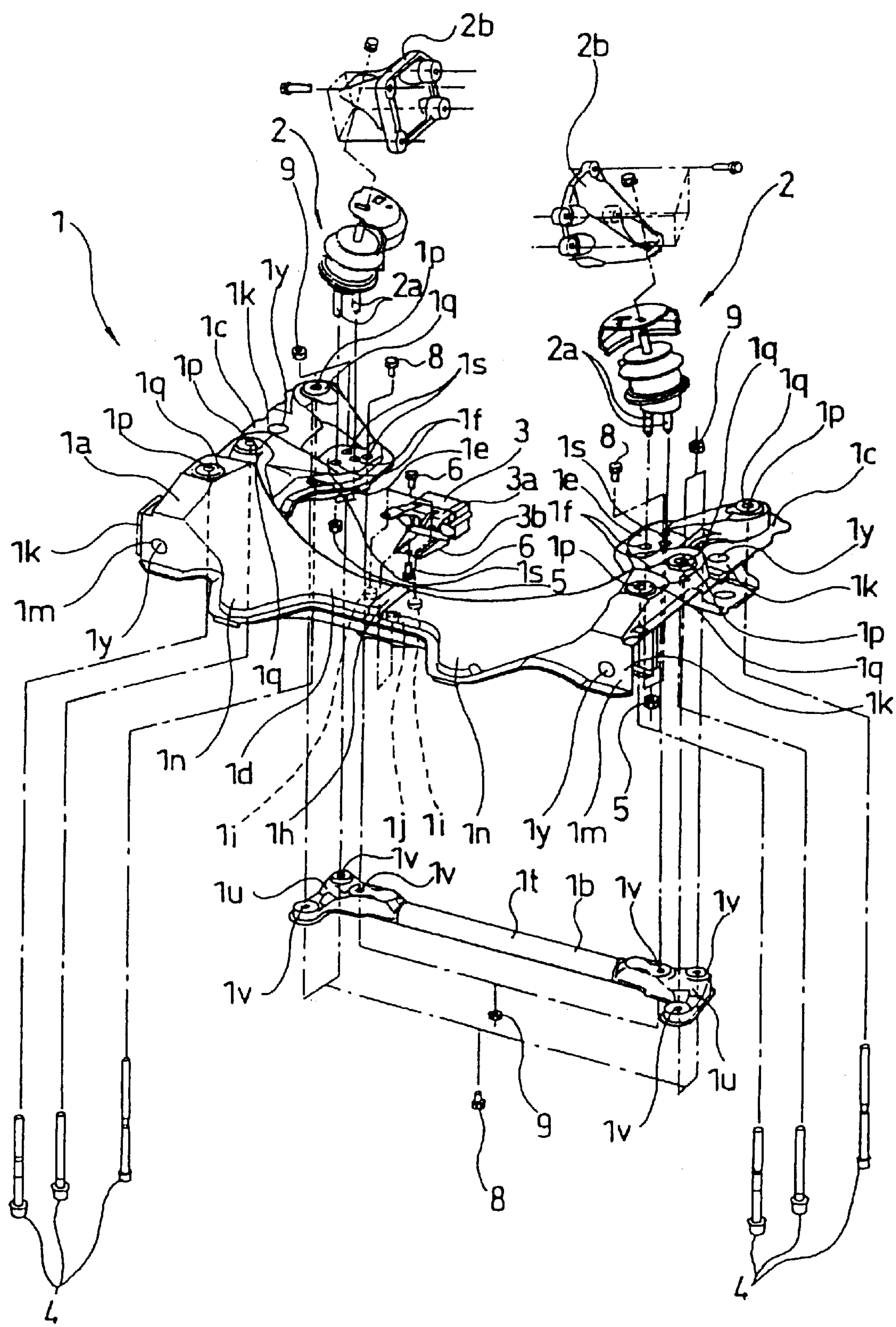
FIG. 4 is an exploded perspective view of the front sub-frame according to the present invention.

The main body 1*a* has on the upper side of the rear end portions of the side parts 1*c*, 1*c* (that is, the side parts of the main body 1*a*) engine mount attaching portions 1*e*, 1*e* which each protrude toward the transverse center of the vehicle M for attachment of the engine mounts 2, 2 thereon (refer to FIGS. 2 and 4). The engine mount attaching portions 1*e*, 1*e* have flat surfaces, respectively, so that bottom portions of the engine mounts 2, 2 can be placed thereon, and bolt holes 1*f*, 1*f*, 1*f*, 1*f* are formed therein as through-holes so that attaching bolts 2*a*, 2*a*, 2*a*, 2*a* extending from the bottom portions of the engine mounts 2, 2 can be put therethrough (refer to FIG. 4). In attaching the engine mounts 2, 2, the engine mounts 2, 2 are attached to the main body 1*a* by allowing the attaching bolts 2*a*, 2*a*, 2*a*, 2*a* to be put through the bolt holes 1*f*, 1*f*, 1*f*, 1*f* so that nuts 5, 5, 5, 5 are screwed on distal end portions of the attaching bolts 2*a*, 2*a*, 2*a*, 2*a* (refer to FIG. 3). The engine E is bolted to brackets 2*b*, 2*b* at both sides of a cylinder block CB thereof so that the engine E is supported on the front sub-frame 1.

The positions where the engine mount attaching portions 1*e*, 1*e* are formed may be located at any place at the rear of the side parts 1*c*, 1*c* of the main body 1*a*, and in supporting the engine E by the front sub-frame 1, the engine mount attaching portions 1*e*, 1*e* are formed at places where a good supporting balance can be provided involving the weight distribution of the engine E. The rear of the main body 1*a* means a position more rearward than the center of the main body la when viewed in a longitudinal direction of the vehicle M.

The main body 1*a* has a stopper attaching portion 1*h* at a central portion of the cross part Id thereof so that a stopper 3 can be attached thereto (refer to FIGS. 2 and 4). The stopper attaching portion 1*h* is formed into substantially a rectangular-shape when viewed from the side thereof, so as to be hollow (refer to FIG. 4). Then, bolt holes 1*i*, 1*i* are formed in the stopper attaching portion 1*h* in such a manner as to penetrate an upper surface thereof, and a bolt hole 1*j* is also formed in the same portion in such a manner as to penetrate a lower surface thereof (refer to FIG. 4). In attaching the stopper 3, the stopper attaching portion 1*h* is interposed between an upper bracket 3*a* and a lower bracket 3*b* (refer to FIGS. 2 and 4). Moreover, the upper bracket 3*a* is bolted down to the upper surface of the stopper attaching portion 1*h* with bolts 6, 6 and nuts (not shown), and the lower bracket 3*b* is also bolted down to the lower surface of the stopper attaching portion 1*h* with a bolt 6 and a nut (not shown) (refer to FIG. 4).

The main body 1*a* has suspension arm attaching portions 1*k*, 1*k*, 1*k*, 1*k* at outward portions of the side parts 1*c*, 1*c* (that is, the side parts of the main body 1*a*), respectively, so that the suspensions SP are attached thereto (refer to FIGS. 2 and 4). Arm attaching holes 1*y*, 1*y*, 1*y*, 1*y*, are formed in the suspension arm attaching portions 1*k*, 1*k*, 1*k*, 1*k*, respectively (refer to FIG. 4). In order to attach lower arms of the suspensions SP that are to be disposed at lower portions of the vehicle M, the front side suspension arm attaching portions 1*k*, 1*k* are formed with subsiding portions 1*m*, 1*m* to allow the front portions of the side parts 1*c*, 1*c* to subside downwardly.

The main body 1*a* has protruding portions 1*n*, 1*n* at a front side of the cross part 1*d* thereof so that a steering gear box (not shown) is supported thereon (refer to FIGS. 2 and 4). The protruding portions 1*n*, 1*n* are formed at both sides outward from the center of the cross part 1*a* in the transverse direction of the vehicle M toward ends thereof in such a manner as to protrude therefrom.

Furthermore, the main body 1*a* has three bolt holes 1*p*, 1*p*, . . . formed in the respective side parts 1*c*, 1*c* so that it is fixed to the pair of side frames SF, SF (refer to FIGS. 2 and 4). The bolt holes 1*p*, p, . . . are through-holes that penetrate the side parts 1*c*, 1*c* in the vertical direction. In addition, securing surfaces 1*q*, 1*q*, . . . are formed on the upper surfaces of the side parts 1*c*, 1*c* where the bolt holes 1*p*, 1*p*, . . . are formed (refer to FIG. 4). The securing surfaces 1*q*, 1*q*, . . . are surfaces where the side parts 1*c*, 1*c* are brought into abutment with the side frames SF, SF, respectively, and the securing surfaces 1*q*, 1*q*, . . . are substantially formed in the same plane. When the front sub-frame 1 is secured to the side frames SF, SF, bolts 4, 4, . . . are inserted into the bolt holes 1*p*, 1*p*, . . . with bolt heads being directed downwardly (refer to FIG. 4).

Moreover, the main body 1*a* has cross member attaching portions 1*r*, 1*r* on lower surfaces of the side parts 1*c*, 1*c* (that 1*s*, the side parts of the main body 1*a*) at the rear end portions, respectively so that the cross member 1*b* is attached thereto. The cross member attaching portions 1*r*, 1*r* are situated on the main body 1*a* at vertically opposite sides to the engine mount attaching portions 1*e*, 1*e*. The cross member attaching portions 1*r*, 1*r* are formed into such a shape that the lower surfaces of the rear end portions of the side parts 1*c*, 1*c* are fitted with the shape (refer to FIG. 4) of upper surfaces of attaching portions 1*u*, 1*u* of the cross member 1*b*, and six bolt hole 1*s*, 1*s*, . . . are formed therein in total (refer to FIG. 2). The bolt holes 1*s*, 1*s*, . . . are through-holes that penetrate the side parts 1*c*, 1*c* in the vertical direction (refer to FIGS. 2 and 4). When the cross member 1*b* is attached to the cross member attaching portions 1*r*, 1*r*, bolts 8, 8, . . . are inserted through the bolt holes 1*s*, 1*s*, . . . (refer to FIG. 4).

In addition, the positions where the cross member attaching portions 1*r*, 1*r* are formed may be anyplace at the rear portion of the main body 1*a* as long as such places allow the cross member to be attached from below. As a result, once the cross member 1*b* is attached to the main body 1*a*, the rigidity of the front sub-frame 1 required when the engine E is mounted thereon can be improved by virtue of the action of the cross member 1*b*, and the rigidity against the transverse inputs from the suspensions SP (refer to FIG. 1) can also be improved. The rear portion of the main body la denotes a position more rearward than the center of the main body 1*a* in the longitudinal direction of the vehicle M.

The cross member 1*b* will be described in detail below.

The cross member 1*b* is removably attached to the cross member attaching portions 1*r*, 1*r* of the main body 1*a*. The cross member 1*b* comprises a semi-cylindrical cross part 1*t* and the attaching portions 1*u*, 1*u* formed at both ends of the cross part 1*t*. The cross part 1*t* is formed into an arc on an upper side thereof so as to have a semi-cylindrical shape (refer to FIG. 4) and has a length substantially equal to the shortest distance between the engine mount attaching portions 1*e*, 1*e* (refer to FIG. 2). The attaching portions 1*u*, 1*u* have each an irregular configuration on upper sides thereof, which is adapted to allow the attaching portions 1*u*, 1*u* to fit in the cross member attaching portions 1*r*, 1*r* of the main body 1*a*, respectively. Furthermore, each of the attaching portions 1*u*, 1*u* are formed with three bolt holes 1*v*, 1*v*, . . . , which penetrate therethrouth in the vertical direction (refer to FIG. 4). When the cross member 1*b* is attached to the cross member attaching portions 1*r*, 1*r*, the bolts 8, 8, . . . are inserted through the bolts holes 1*v*, 1*v*, . . . (refer to FIG. 4).

The attachment of the cross member 1*b* to the main body 1*a* will be described below. First, the attaching portions 1*u*, 1*u* of the cross member 1*b* are fitted in the cross member attaching portions 1*r*, 1*r* of the main body 1*a*. Then, the six bolts 8, 8, . . . are inserted through the bolt holes 1*v*, 1*v*, . . . of the attaching portions 1*u*, 1*u* and the bolt holes 1*s*, 1*s*, . . . of the cross member attaching portions 1*r*, 1*r*. In order to improve the attaching strength, of the six bolts 8, 8, . . . , two inboard bolts are directed such that the bolt heads thereof face upwardly and four outboard bolts are directed such that the bolt heads thereof face downwardly (refer to FIG. 4). Then, nuts 9, 9, . . . are screwed on the distal portions of the bolts 8, 8, . . . (refer to FIG. 4), so that the cross member 1*b* is secured to the main body 1*a*. Once the engine E is supported on the front sub-frame 1, there exists only the cross member 1*b* as a member of the front sub-frame 1 below the oil pan OP.

In addition, when the cross member 1*b* is removed from the main body 1*a*, the nuts 9, 9, . . . are loosened on the bolts 8, 8, . . . so that the nuts 9, 9, . . . are removed from the bolts 8, 8, . . . Then, the bolts 8, 8, . . . are dislocated from the bolts holes 1*v*, 1*v*,. . . and the bolt holes 1*s*, 1*s*, and the cross member 1*b* is removed from the main body 1*a*.

The securement of the front sub-frame 1 to the side frames SF, SF will be described below.

First, the front sub-frame 1 is situated under the side frames SF, SF, and then, the bolt holes 1*p*, 1*p*, . . . of the main body 1*a* are aligned with bolt holes (not shown) of the side frames SF, SF (refer to FIG. 2). Next, six bolts 4, 4, . . . are inserted through the bolt holes 1*p*, 1*p*, . . . of the main body 1*a*. Then, the bolts 4, 4, . . . are inserted with the heads thereof being directed downwardly. Following this, the bolts 4, 4, . . . are screwed into the bolt holes of the side frames SF, SF so that the front sub-frame 1 is secured to the side frames SF, SF (refer to FIG. 2).

According to the structure of the front sub-frame 1, since the cross member 1*b* is attached to the bottom rear end portion of the main body 1*a*, the opening formed in the rear of the main body 1*a* is closed, so as to improve not only the rigidity of the whole front sub-frame 1 but also the rigidity against the transverse inputs from the suspensions SP (refer to FIG. 1). Moreover, since the cross member 1*b* is attached to the lower portions of the engine mount attaching portions 1*e*, 1*e*, so as to support the engine mount attaching portions 1*e*, 1*e* from the lower portions, the rigidity in supporting the engine E can also be improved.

Referring to FIG. 5, an operation in removal of the oil pan OP will be described below.

Figure 5A:
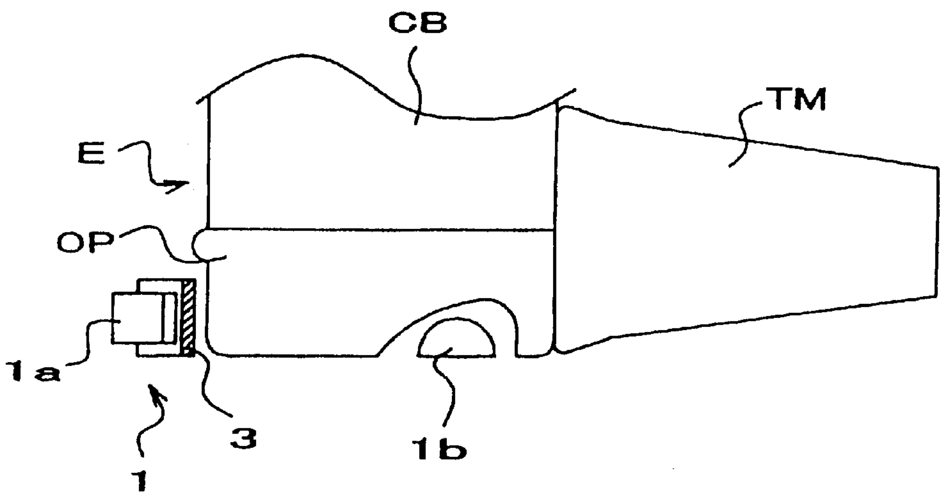
FIGS. 5A to 5C are operational views showing an operation of removing an oil pan according to the present invention, FIG. 5A showing a state in which a cross member is attached to a main body, FIG. 5B showing a state in which the cross member is removed from the main body, and FIG. 5C showing a state in which the oil pan is removed from an engine.
Figure 5B:
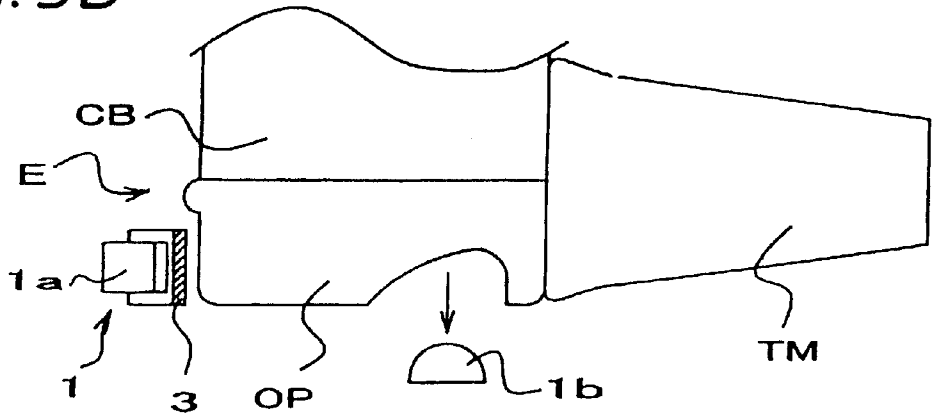
Figure 5C:
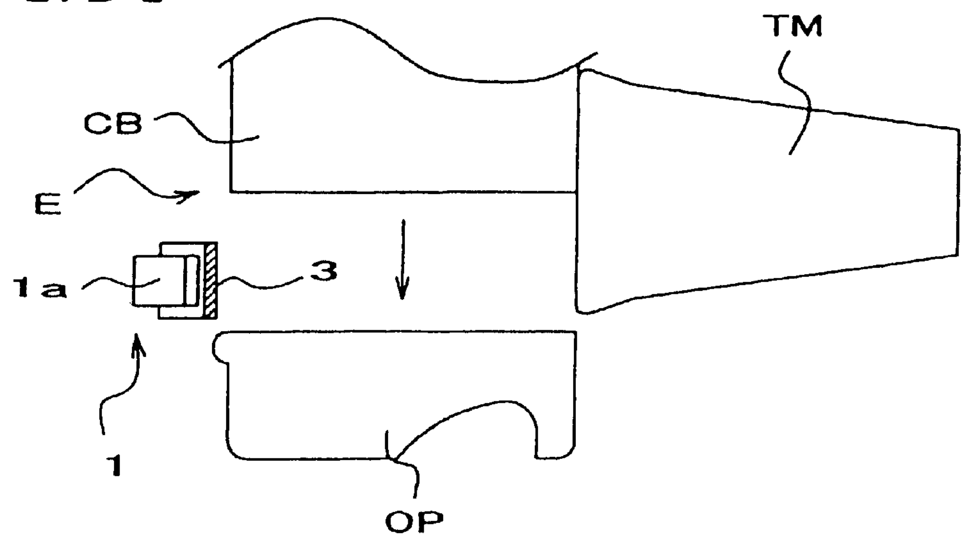
Figure 6A:
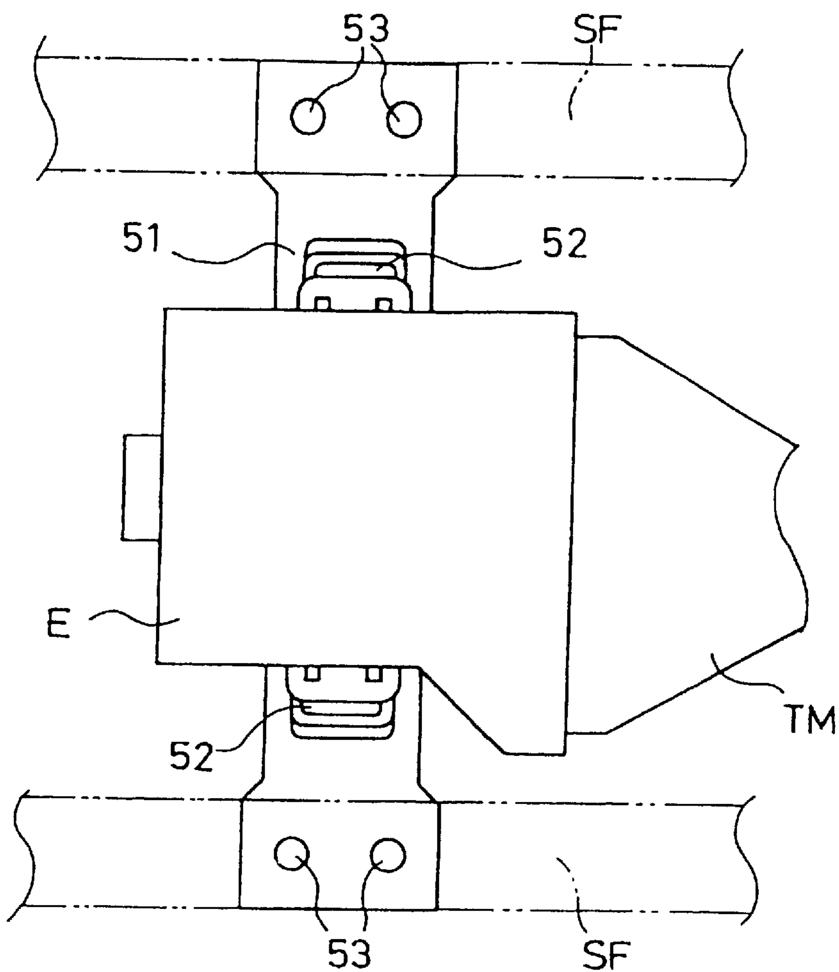
FIGS. 6A and 6B are schematic views of a conventional front sub-frame, FIG. 6A being a plan view, and FIG. 6B being a side view thereof.
Figure 6B:
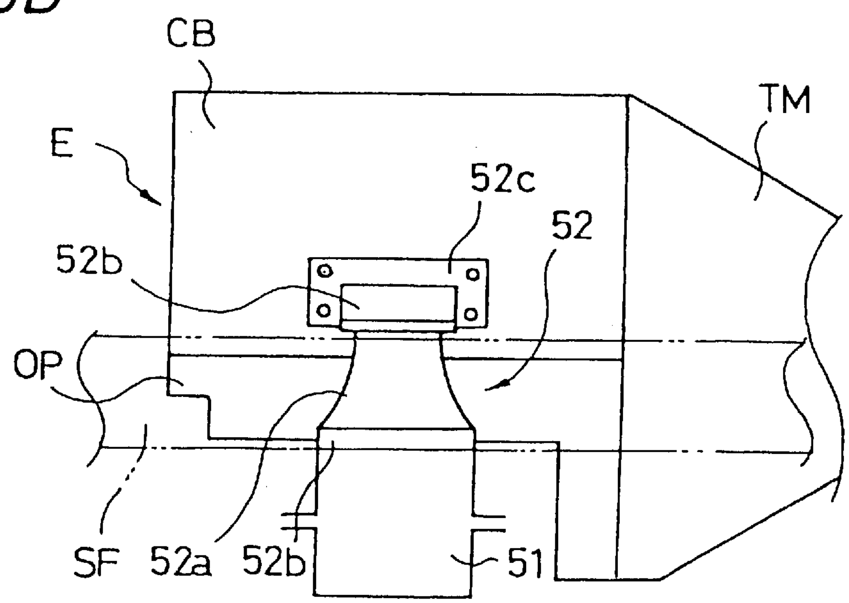

First, when the cross member 1*b* is attached to the main body 1*a*, the cross member 1*b* is located under the oil pan OP (refer to FIG. 5A). This prevents the oil pan from being moved downwardly (that is, being removed). To cope with this, the cross member 1*b* is removed from the main body 1*a* in such a manner as described above (refer to FIG. 5B). Then, the oil pan OP is released from the confinement at a position therebelow, whereby the oil pan OP is removed from the cylinder block CB (refer to FIG. 5C). When the oil pan is re-attached, the removal procedure may be carried out in an opposite fashion in time series, and therefore a description thereof will be omitted here. Thus, the removal and re-attachment of the cross member 1*b* from and to the main body 1*a* can be effected through the simple operations.

As described above, in servicing the oil pan OP, the front sub-frame 1 does not have to be removed from the side frames SF, SF, this obviating the necessity of carrying out complicated operations. In addition, since the front sub-frame 1 is not removed, there is no need to adjust the alignment of the suspensions SP.

Thus, being not limited to the aforesaid embodiment, the present invention may be embodied in various modes.

For instance, although the single cross member is attached in the described embodiment, a plurality of cross members may be attached so as to improve the rigidity further.

According to the front sub-frame structure according to the present invention, in servicing the oil pan, there is no need to carry out removing and re-attaching operations of the front sub-frame, but only cross member removing and re-attaching operations have to be carried out. Moreover, since the front sub-frame to which the suspensions are attached is not removed, there is no need to carry out an alignment adjustment for the suspensions, thereby making it possible to improve the operability in servicing the oil pan to a great extent.

In addition, since the cross member is attached to the front sub-frame which is made open toward the rear thereof, the rigidity can be improved at the engine mount portions of the front sub-frame. Furthermore, the rigidity against the ransverse inputs from the suspensions can also be improved.

What is claimed is:

1. A front sub-frame structure that supports an engine and to which suspensions are attached, comprising:

a front sub-frame main body having a substantially U-shaped configuration, when viewed from the top, to define an opening directed rearward;

engine mounts attached to rear portions of side parts of said front sub-frame main body, for supporting said engine; and a cross member connecting said side parts of said front sub-frame main body at said rear portions thereof, said cross member being removably attached to said front sub-frame main body to an underside surface of said front sub-frame main body.

2. A front sub-frame structure according to claim 1, wherein said cross member is disposed below said engine mounts.

3. A front sub-frame structure according to claim 1, wherein said side parts of said front sub-frame main body are respectively extended along a pair of side frames.

4. A front sub-frame structure according to claim 3, wherein said side frames are respectively mounted on upper surfaces of said side parts of said front sub-frame main body.

5. A front sub-frame structure according to claim 1, wherein said front sub-frame main body includes protruding parts protruding inwardly in a transverse direction of a vehicle at said rear portions of said side parts thereof, said engine mounts are respectively mounted on upper surfaces of said protruding parts, and said cross member is attached to lower surfaces of said protruding parts.

6. A front sub-frame structure according to claim 1, wherein suspension arm attaching portions for attaching said suspensions are respectively formed in said side parts of said front sub-frame main body.

7. A front sub-frame structure according to claim 6, wherein said suspension arm attaching portions for attaching lower arms of said suspensions are respectively formed in front portions of said side parts which subside downwardly.

* * * * *